United States Patent [19]
Farrell et al.

[11] Patent Number: 5,911,679
[45] Date of Patent: *Jun. 15, 1999

[54] VARIABLE PITCH ROTOR ASSEMBLY FOR A GAS TURBINE ENGINE INLET

[75] Inventors: William M. Farrell; Padmakar M. Niskode, both of Cincinnati; Michael W. Horner, West Chester, all of Ohio

[73] Assignee: General Electric Company, Cincinnati, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/775,699

[22] Filed: Dec. 31, 1996

[51] Int. Cl.⁶ .................................................. F02C 7/042
[52] U.S. Cl. ........................ 60/39.183; 60/726; 415/149.2
[58] Field of Search ............................. 60/39.183, 39.33, 60/726, 39.161, 236; 415/149.2, 149.4, 149.1, 162

[56] References Cited

U.S. PATENT DOCUMENTS

| | | | |
|---|---|---|---|
| 2,952,973 | 9/1960 | Hall et al. | 60/39.161 |
| 3,449,914 | 6/1969 | Brown | 60/39.161 |
| 3,609,967 | 10/1971 | Waldman | 60/39.183 |
| 4,170,874 | 10/1979 | Kyrklund | 60/39.183 |

FOREIGN PATENT DOCUMENTS 395357  12/1947  United Kingdom ................ 415/149.2

*Primary Examiner*—Louis J. Casaregola
*Attorney, Agent, or Firm*—Andrew C. Hess; Nathan D. Herkamp

[57] ABSTRACT

A cospander for extending the high efficiency range of a turbine engine is described. A cospander, in one aspect, is a turbomachinery device including at least one stage wherein stator vane and rotor blade rows are continuously variable to an extent that each stage can be operated in compression, expansion, or null modes depending on the blade and vane angles at any specific operating point. Such a device placed ahead or within a typical compressor has the effect of reducing, increasing, or maintaining the through flow of the primary working fluid. Such flow variation control can be used to achieve the desired overall turbomachinery thermal efficiency improvements over a wider operating range than is otherwise possible. In one specific embodiment, for example, the cospander includes a variable stator vane and a variable pitch rotor blade in series flow relationship.

28 Claims, 5 Drawing Sheets

VARIABLE PITCH ROTOR ASSEMBLY FOR A GAS TURBINE ENGINE INLET

FIELD OF THE INVENTION

This invention relates generally to gas turbine engines and more particularly, to a gas turbine engine including one or more cospander stages for providing continuously variable compression and expansion of flow through turbine engines.

BACKGROUND OF THE INVENTION

Gas turbine engines generally include a high pressure compressor for compressing air flowing through the engine, a combustor in which fuel is mixed with the compressed air and ignited to form a high energy gas stream, and a high pressure turbine. The high pressure compressor, combustor and high pressure turbine sometimes are collectively referred to as the core engine. Such gas turbine engines also may include a low pressure compressor for supplying compressed air, for further compression, to the high pressure compressor.

Normally the compressor efficiency decreases as the compressor inlet corrected flow (along with speed) is reduced beyond about 80% of the design point (DP) flow. Similar efficiency decreases occur with increased inlet corrected flows over about 110% of the DP flow.

It would be desirable to extend the compressor higher efficiency operation beyond the flow ranges described above. It also would be desirable to provide such an extended higher efficiency range without significantly increasing the cost of the engine. At low power, it is desirable to provide improved cycle thermal efficiency and reduced NOx emissions.

SUMMARY OF THE INVENTION

These and other objects may be attained by a gas turbine engine including a cospander located upstream of the compressor inlet so that the cospander discharges into the compressor inlet. Generally, the cospander is selectively operable as an expander and as a compressor, and many alternative embodiments of the cospander are possible and contemplated. A cospander, in one aspect, is a turbomachinery device including at least one stage wherein stator vane and rotor blade rows are continuously variable to an extent that each stage can be operated in compression, expansion, or null modes depending on the blade and vane angles at any specific operating point. Such a device placed ahead or within a typical compressor has the effect of reducing, increasing, or maintaining the through flow of the primary working fluid. Such flow variation control can be used to achieve the desired overall turbomachinery thermal efficiency improvements over a wider operating range than is otherwise possible. In one specific embodiment, for example, the cospander includes a variable stator vane and a variable pitch rotor blade in series flow relationship.

The cospander components are controlled, as described below in more detail, so that the cospander serves as an expander in the lower flow region, i.e., lower than the DP flow, and serves as a supercharger in the higher flow region, i.e., higher than the DP flow. More particularly, when the cospander is serving as an expander, the cospander is a debooster and lowers the overall compression system pressure ratio (compressor outlet pressure as a multiple of the ambient inlet pressure) and the flow at the same speed. Even with lower actual flows, the high pressure compressor still operates in its higher corrected flow and higher efficiency region than it would have without the cospander. In the debooster mode, the cospander could also be used to help the compressor start-ups by minimizing the bleed requirements, since it effectively lowers the flow. In the higher flow region, the cospander is a compressor.

The above described cospander extends the compressor higher efficiency operation beyond the typical flow ranges and provides such an extended higher efficiency range without significantly increasing the cost of the engine. At low power, the cospander facilitates improved cycle thermal efficiency and reduced NOx emissions.

DETAILED DESCRIPTION OF THE DRAWINGS

Figure 1:
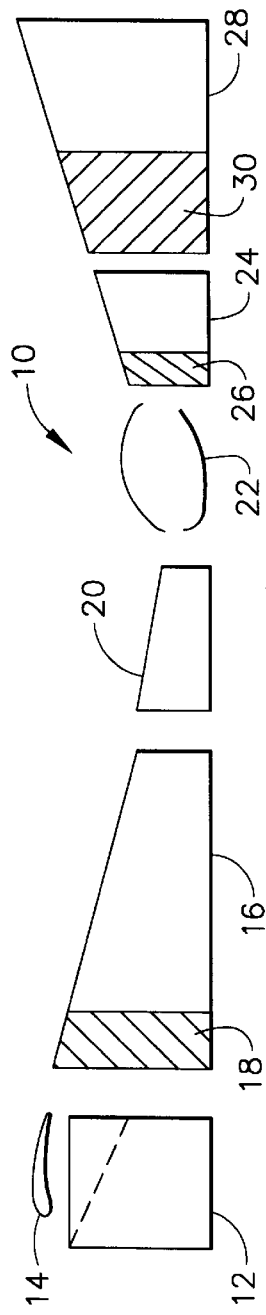
FIG. 1 is a schematic illustration of an axial flow gas turbine engine including a cospander in accordance with one embodiment of the present invention.

FIG. 1 illustrates, in schematic form, a gas turbine engine 10 in accordance with one embodiment of the present invention. Engine 10 includes, in series flow relationship, a cospander 12 including an inlet flow regulator (e.g., a VIGV) 14, a compressor 16 including a destage 18 to reduce the design point flow, and a booster 20. Cospander 12 supplies air to an inlet of compressor 16, and compressor 16 supplies air to an inlet of booster 20. Booster 20 may include variable inlet guide vanes (VIGVs) operable to trim booster flow and pressure ratio.

Generally, cospander 12 is selectively operable as an expander and as a compressor, and many alternative embodiments of cospander 12 are possible and contemplated. Cospander 12, in one aspect, is a turbomachinery device including at least one stage wherein stator vane and rotor blade rows are continuously variable to an extent that each stage can be operated in compression, expansion, or null modes depending on the blade and vane angles at any specific operating point. Such a device placed ahead or within a typical compressor has the effect of reducing, increasing, or maintaining the through flow of the primary working fluid. Such flow variation control can be used to achieve the desired overall turbomachinery thermal efficiency improvements over a wider operating range than is otherwise possible.

Engine 10 further includes a combustor 22 for receiving airflow from booster 20. Airflow from combustor 22 is supplied to an inlet of a high pressure turbine 24 which includes a stage 26 for smaller flow, which may include a variable area turbine nozzle (VATN) (not shown), and airflow from high pressure turbine 24 is supplied to an inlet of a low pressure turbine 28, which includes a VATN 30.

Generally, cospander 12 serves as an expander in the lower flow region, i.e., lower than the DP flow, and serves as a supercharger in the higher flow region, i.e., higher than the DP flow. When cospander 12 is serving as an expander, cospander 12 is a debooster and lowers the overall compression system pressure ratio (compressor outlet pressure as a multiple of the ambient inlet pressure, i.e., p/p) and the flow at the same speed. Even with lower actual flows, high pressure compressor 20 still operates in its higher corrected flow and higher efficiency region than it would have without cospander 12. In the debooster mode, cospander 12 could also be used to help compressor start-ups by minimizing the bleed requirements, since it effectively lowers the flow. In the higher flow region, cospander 12 is a compressor.

Figure 2:
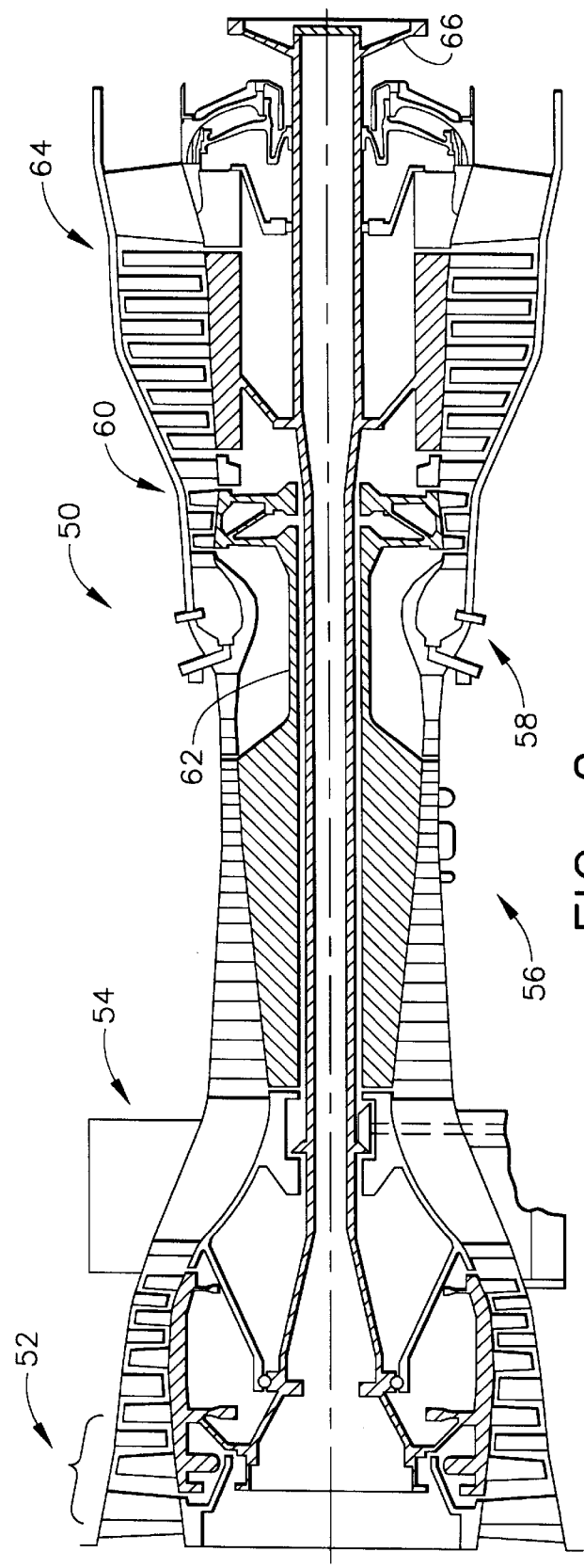
FIG. 2 is a cross-sectional view of a gas turbine engine.

FIG. 2 is a cross-sectional view of a gas turbine engine 50 which is illustrated herein to identify a location 52 of a cospander in a typical application. Engine 50, as is well known, includes a low pressure compressor 54, a high pressure compressor 56, and a combustor 58. Engine 50 also includes a high pressure turbine 60 driven on a high pressure shaft 62 and a power turbine 64 driven on a power turbine shaft 66. The location for the cospander is indicated generally at 52, although a cospander is not shown in FIG. 2.

In operation, air flows through low pressure compressor 54, and compressed air is supplied from low pressure compressor 54 to high pressure compressor 56. The air is further compressed by high pressure compressor 56, and highly compressed air is delivered to combustor 58. Airflow from combustor 58 drives high pressure turbine 60 and power, or low pressure, turbine 64.

Figure 3:
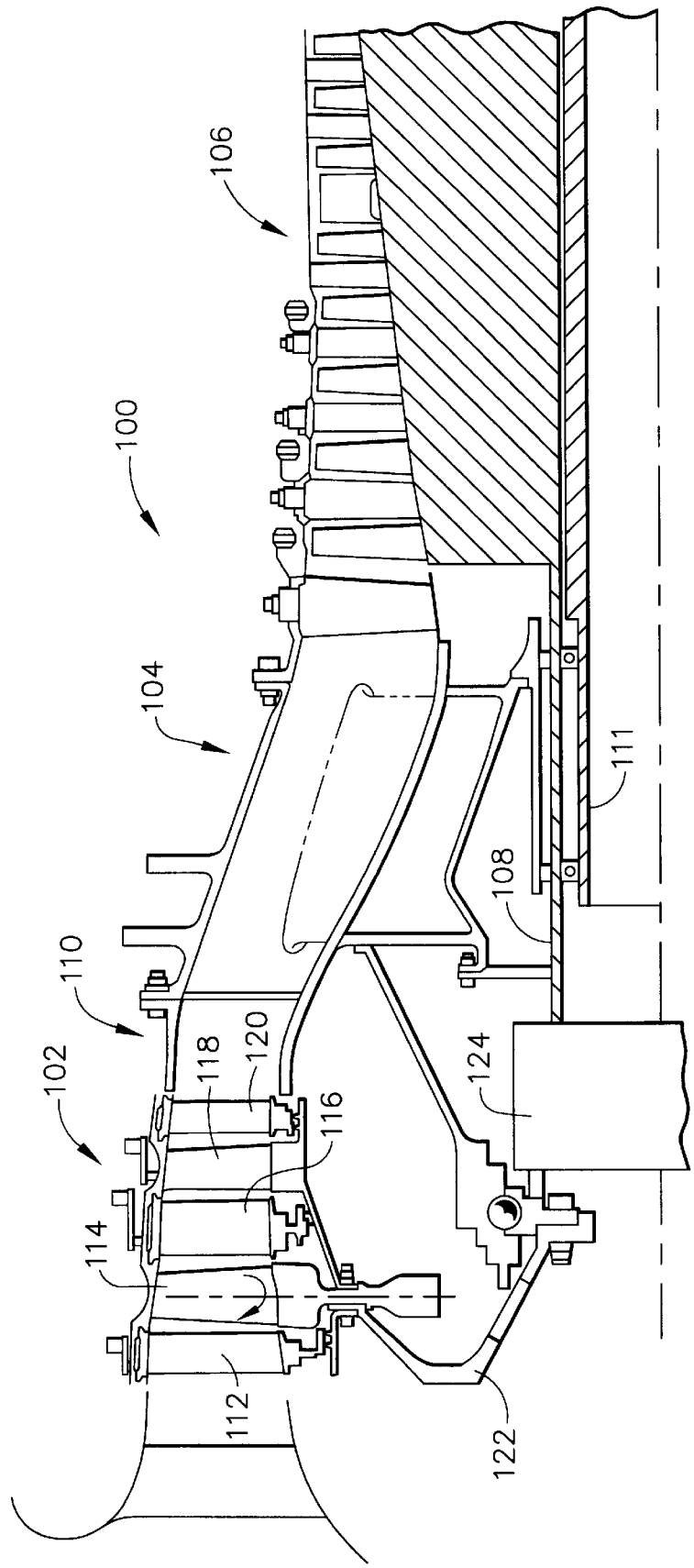
FIG. 3 is an enlarged view of a portion of a gas turbine engine including a cospander in accordance with one embodiment of the present invention.

FIG. 3 is an enlarged view of a portion of a gas turbine engine 100 including a cospander 102 in accordance with one embodiment of the present invention. Engine 100 includes a duct 104 for conveying air from cospander 102 to a high pressure compressor 106 driven on a high pressure shaft 108. Engine 100 may, of course, include a low pressure compressor in the area generally indicated at 110 driven by a shaft 111. Cospander 102 is located at an inlet to low pressure compressor 104, and cospander 102 includes a variable inlet guide vane (VIGV) 112, a variable pitch rotor blade 114, a variable stator vane 116, a variable exit guide vane 118, and a fixed exit guide vane 120, in series flow relationship. The orientations of VIGV 112, variable pitch rotor blade 114, variable stator vane 116, and variable exit guide vane 118 are controlled by external controls, which are well known.

Variable pitch rotor blade 114 is driven by a gear driver 122. For an optimum performance, rotor blade 114 probably should rotate at a lower speed than high pressure compressor 106. Such lower rotation speed can be accomplished by gearing 124 coupled to high pressure shaft 108 so that the rotation speed of gear driven shaft 122 is lower than the rotation speed of high pressure shaft 108. Alternatively, rotor blade 114 could be driven by an independent lower speed driver, such as low pressure turbine shaft 112.

Rotor blade 114 and stator vane 116, in one embodiment, are uncambered airfoils with a stagger angle continuously varied over a range which allows each cascade (both rotor 114 and stator 116) to operate at various amounts of angles of incidence (both positive and negative). Alternatively, slightly cambered airfoils could be used for rotor blade 114 and stator vane 116 so as to favor either the expansion or the compression, i.e., have larger expansion p/p than compression p/p, or vice versa. The amount of cambering typically is selected to be less than the incidence angle in order to provide an induced swirl in a direction opposite to that of the camber. Further, additional variable pitch rotor stages could be added after variable stator vane 116. A variable stator in series flow with a fixed exit guide vane would follow each such additional rotor stage.

Figure 4:
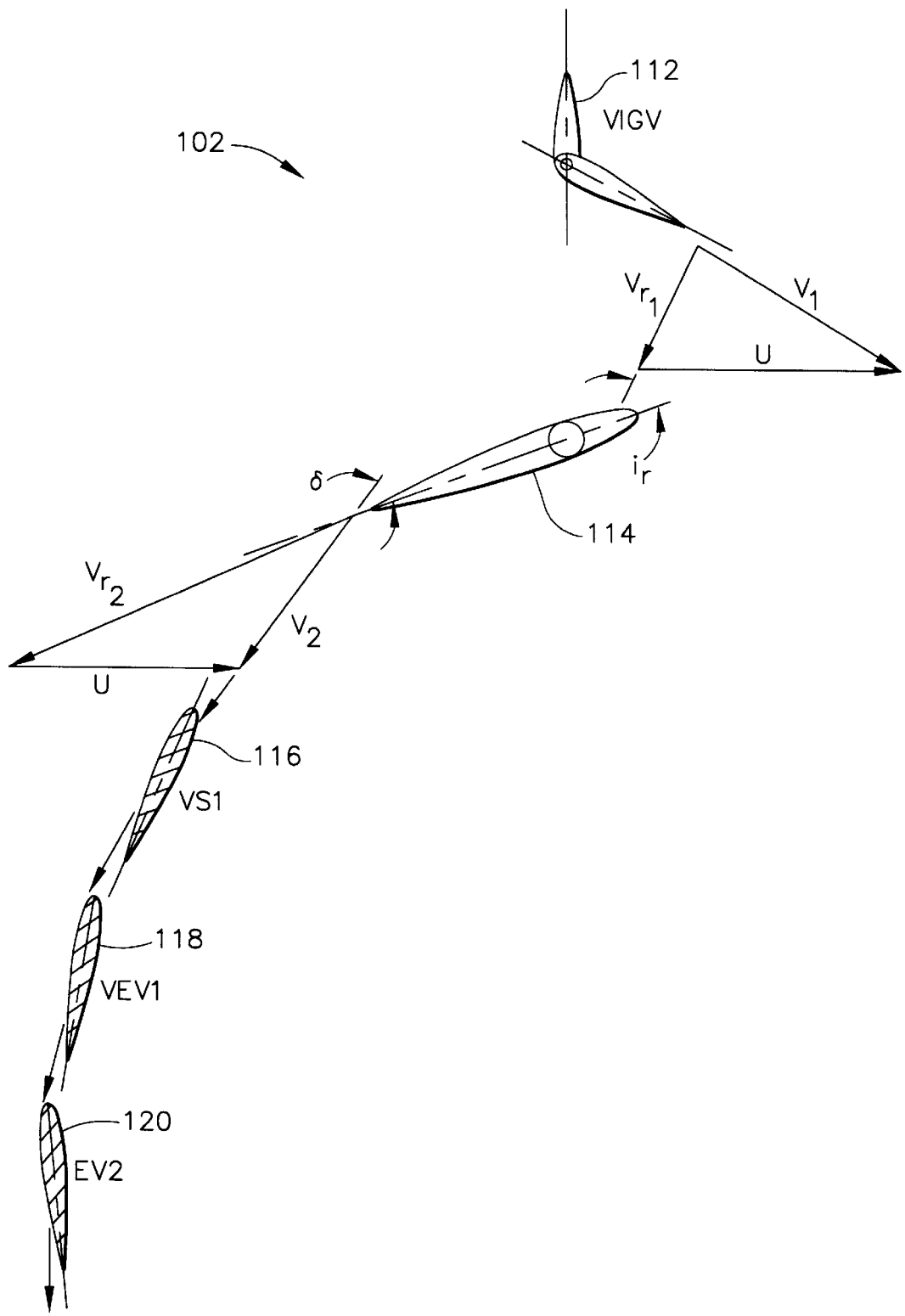
FIG. 4 is an air flow diagram illustrating air flow through the cospander when the cospander is operating as an expander.
Figure 5:
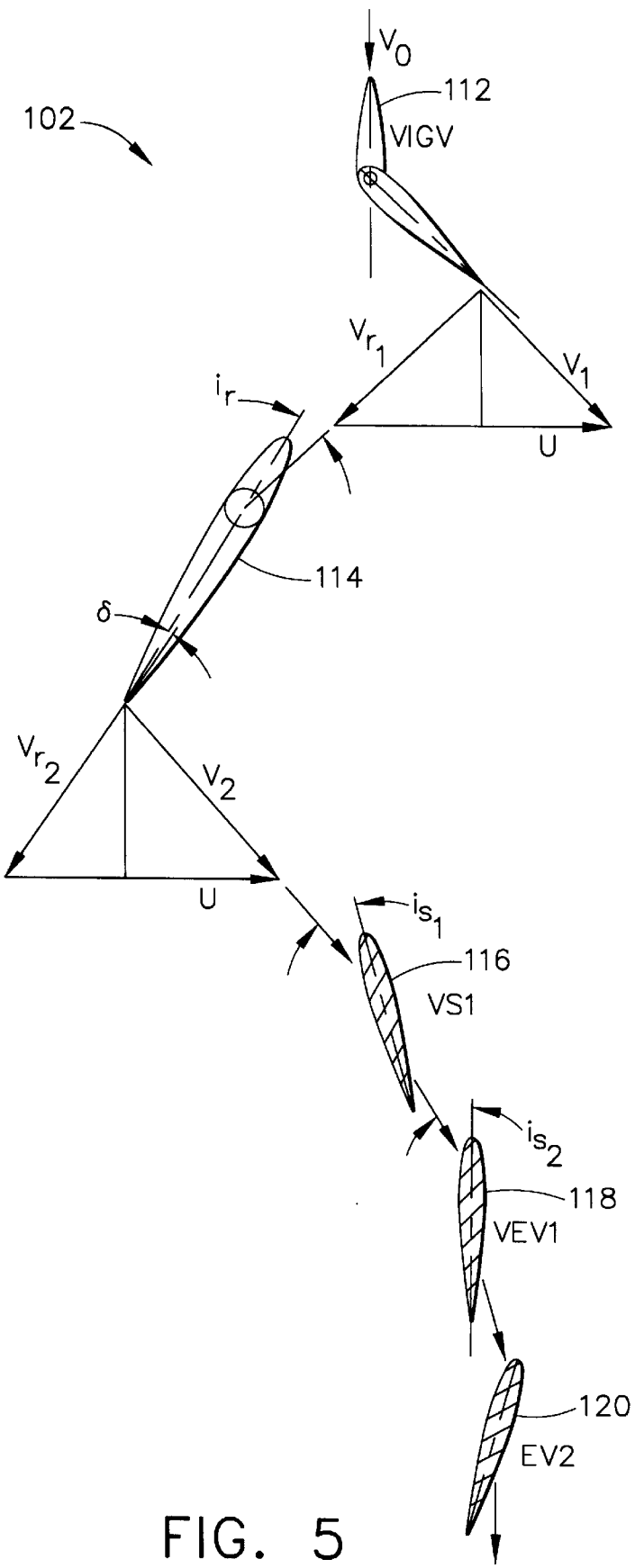
FIG. 5 is an air flow diagram illustrating air flow through the cospander when the cospander is operating as a compressor.

Referring to FIGS. 4 and 5 which are air flow diagrams illustrating air flow through cospander 102 when cospander 102 is operating as an expander and as a compressor, respectively. The basic action for any given inlet flow velocity is provided by variable pitch rotor blade 114 which changes from a positive angle of incidence (FIG. 5), creating or increasing a positive swirl to a negative angle of incidence (FIG. 4), creating a negative swirl (or decreasing forward swirl). To optimize the efficiency or the pressure ratio, VIGV 112 could be oriented to provide a bit of compromise between compression and expansion. Normally, expansion (FIG. 4) requires airfoils 116, 118 and 120 to be rotated closed, to reduce tangential swirl and diffuse the flow, and compression (FIG. 5) requires airfoils 116, 118 and 120 to be rotated open to reduce tangential swirl and diffuse the flow.

Alternatively, airfoils 116, 118, and 120, positioned downstream of rotor 114 to take out the swirl induced by rotor 114, could be replaced by another rotor stage rotating in a direction counter to the direction in which rotor 114 rotates. Although this counter-rotating rotor stages embodiment of the cospander may add complexity to the cospander rotor drive arrangement, it can significantly reduce the overall length, and potentially the weight, of the cospander.

A compromise can be made in selecting the airfoil twist, i.e., stagger angle variable with airfoil (radial) height. Generally, an expander requires fairly closed stagger angle, whereas a compressor requires more open stagger angle. Further, the variation in twist from the outer diameter (OD) to the inner diameter (ID) is larger in a compressor than in a turbine, to provide constant pressure ratio over the height. If this twist is compromised by, for example, making it smaller than required for the compressor and larger than required for the turbine, it will result in a skewed pressure profile, which results in generating more of an induced pressure difference at the OD than at the ID. The amount of compression or expansion is greater at the tip (OD) than at the root (ID) because of greater blade speed. By increasing the radius ratio (ratio of ID to OD) and/or lowering the compression or expansion pressure ratio, the required compromise can be lower, and the difference between the desired airfoil twist angles for both compression and expansion can be lowered. The same type of compromise can be made for the inlet, or the impeller eye, of a centrifugal (radial flow) compressor for variation of the pressure ratio.

Figure 6:
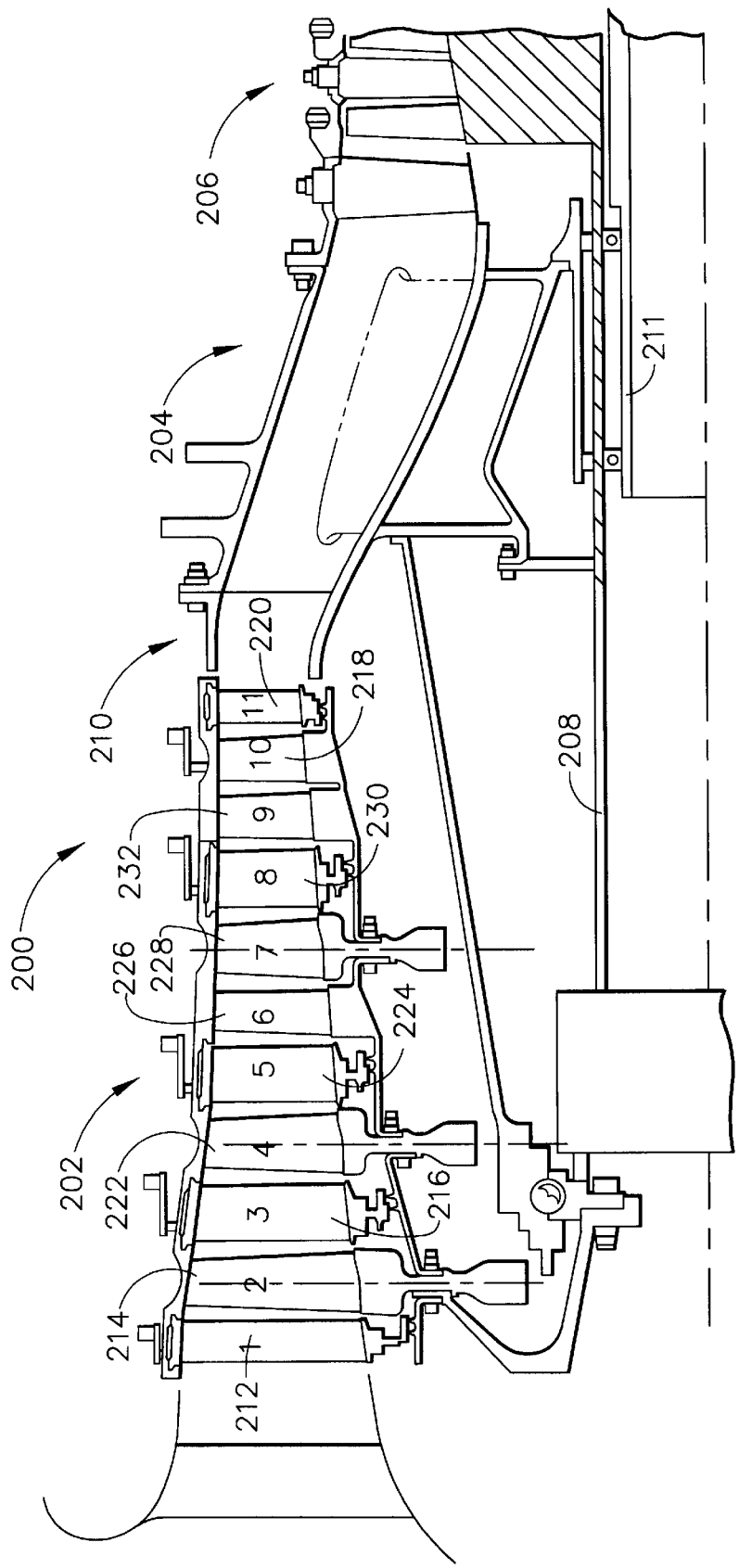
FIG. 6 is a view of a portion of a gas turbine engine in accordance with a further embodiment of the present invention.

FIG. 6 is an enlarged view of a portion of a gas turbine engine 200 including a cospander 202 in accordance with another embodiment of the present invention. Engine 200 includes a duct 204 for conveying air from cospander 202 to a high pressure compressor 206 driven on a high pressure shaft 208. Engine 200 may, of course, include a low pressure compressor in the area generally indicated at 210 driven by a shaft 211. Cospander 202 is located at an inlet to duct 204, and cospander 202 includes a variable inlet guide vane (VIGV) 212, a variable pitch rotor blade 214, a variable stator vane 216, a variable exit guide vane 218, and a fixed exit guide vane 220, in series flow relationship.

Cospander 202 further includes a second variable pitch blade rotor 222, a second variable stator vane 224, and a second fixed exit guide vane 226 located between variable stator vane 216 and variable exit guide vane 218. Additionally, a third variable pitch blade rotor 228, a third variable stator vane 230, and a third fixed exit guide vane 232 are located between second fixed exit guide vane 226 and variable exit guide vane 218. The orientations of VIGV 212, variable pitch blade rotor 214, variable stator vane 216, second variable pitch blade rotor 222, second variable stator vane 224, third variable pitch blade rotor 228, third variable stator vane 230, and variable exit guide vane 218 are controlled by external controls, which are well known.

An example of a cospander application is a marine gas turbine. The marine gas turbine typically operates over a full range of power (~0% to full load) and typically needs to operate on a continuous basis at any power setting in this range. The normal cruise horsepower is about one third of the Design Point horsepower. The fuel consumption characteristics are generally related in non-linear proportion to the horsepower, where typical lower horsepower at cruise fuel consumption is very high. The above described cospander can be used to reduce the actual engine airflow. Lower airflow requires higher cycle temperature to produce the same horsepower, which results in a better thermal efficiency, and consequently, savings in the mission fuel burn. It is contemplated that the above described cospander can be used in connection with a wide range of types of gas turbines from a single shaft generator drive industrial gas turbine to a high bypass aero engine.

While the preferred embodiment for a military marine gas turbine application has been described above and shown in FIG. 3, other configurations are also possible and contemplated, and within the scope of the present invention. For example, the stator vanes perform the function of either adding tangential swirl (as in the VIGV) or reducing tangential swirl (as with the downstream fixed and variable stators). Therefore, depending on the variable rotor rotational speed, diameter, blade length, turning angle, and other application specific parameters, variations in the number and variability (i.e., whether a given stator can be varied during operation regarding its angular orientation) of stator rows are subject to design choice to achieve desirable operational characteristics, such as efficiency, start-up, etc.

For example, an alternative embodiment would be a configuration wherein the aforementioned VIGV is a fixed position stator vane, and only one fixed stator vane is employed downstream of the variable rotor blade. Yet another alternative embodiment would be a configuration wherein there is no inlet stator vane row, and one variable downstream stator vane row.

With respect to industrial gas turbines, including two spool gas generators, the above described cospander can be utilized to provide improved part power fuel economy, especially for Dry Low NOx gas turbines which require significant bleed air at part power operation in current production gas turbines. The need for part power bleed is particularly evident in certain turbine configurations which ties the low pressure compressor to the load or power turbine which is constrained in power generation applications to operate at constant speed (3600 rpm for 60 cycle, and 3000 rpm for 50 cycle).

With respect to two shaft gas turbine generators, the above described cospander would most likely, although not necessarily, be incorporated in the first stage of the low pressure compressor. This configuration would tend to reduce the overall impact on shop cost, since the existing components in the low pressure compressor first stage could simply be replaced, or modified, by the cospander. The cospander can further be operated to provide reduced power improved Nox and cycle thermal efficiency for industrial and marine applications with single and two shaft gas generators.

The above described cospander may substantially eliminate the need for, and consequently the cost of, compressor bleed doors with their attendant ducting and silencing. It is also possible that the use of the cospander could broaden the range of acceptable fuels and injected diluents for the Dry Low Emissions combustors without changing premixer hardware.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A gas turbine engine comprising:
   a first compressor; and
   means for providing air to an inlet of said first compressor, said inlet means operable as an expander and as a second compressor, and comprising a variable pitch blade rotor.

2. A gas turbine engine in accordance with claim 1 wherein said inlet means further comprises at least one stage comprising a variable stator vane.

3. A gas turbine engine in accordance with claim 1 wherein said inlet means further comprises a first variable stator vane being a variable inlet guide vane, a second variable stator vane, a third variable stator vane being a variable exit guide vane, and a fixed exit guide vane.

4. A gas turbine engine in accordance with claim 3 further comprising at least one second variable pitch blade rotor stage located between said variable stator vane and said variable exit guide vane.

5. A gas turbine engine in accordance with claim 3 further comprising a plurality of second variable pitch blade rotor stages located between said variable stator vane and said variable exit guide vane.

6. A gas turbine engine in accordance with claim 5 further comprising a fourth variable stator vane and a fixed exit guide vane between each of said plurality of variable pitch blade rotor stages.

7. A gas turbine engine in accordance with claim 1 wherein said inlet means further comprises a first fixed position stator vane and a second fixed stator vane downstream of said variable pitch rotor blade.

8. A gas turbine engine in accordance with claim 1 further comprising a low pressure compressor positioned in series flow with, and between, said first compressor and said inlet means, wherein said first compressor is a high pressure compressor.

9. A gas turbine engine in accordance with claim 8 further comprising:
   a combustor located substantially adjacent an output of said high pressure compressor;
   a high pressure turbine located substantially adjacent an output of said combustor, said high pressure turbine coupled to said high pressure compressor by a high pressure rotor shaft; and
   a low pressure turbine located substantially adjacent an output of said high pressure turbine.

10. A gas turbine engine in accordance with claim 9 wherein said low pressure turbine is coupled to said low pressure compressor by a low pressure rotor shaft.

11. A gas turbine engine in accordance with claim 9 wherein said low pressure turbine rotates freely of said high pressure turbine and said high pressure compressor.

12. A gas turbine engine in accordance with claim 1 wherein when said inlet means is configured as an expander, said inlet means lowers the first compressor outlet pressure as a multiple of the ambient inlet pressure, and lowering the airflow.

13. A gas turbine engine in accordance with claim 12 wherein when said inlet means is operable as a compressor, said inlet means increases the first compressor outlet pressure as a multiple of the ambient inlet pressure, and increasing the airflow.

14. A gas turbine engine in accordance with claim 1 wherein said inlet means further comprises at least two counter-rotating variable pitch blade rotor rows.

15. A gas turbine engine comprising a high pressure compressor, at least one additional compressor stage and at least a first continuously variable stator vane, said first stator vane being an exit guide vane and being located downstream of said additional compressor stage and upstream of said high pressure compressor, said additional compressor stage comprises a variable pitch blade rotor and a second variable stator vane.

16. A gas turbine engine in accordance with claim 15 wherein said additional compressor stage further comprises a third variable stator vane, said second variable stator vane being a variable inlet guide vane, and wherein said gas turbine engine further comprises a fixed exit guide vane.

17. A gas turbine engine comprising:
   a first compressor, said first compressor configured as a high pressure compressor;
   a first continuously variable stator vane located upstream of said high pressure compressor; and
   a variable pitch blade rotor and a second variable stator vane located upstream of said first continuously variable stator vane.

18. A gas turbine engine in accordance with claim 17 further comprising a variable inlet guide vane located upstream of said variable pitch blade rotor.

19. A gas turbine engine in accordance with claim 18 further comprising a first fixed exit guide vane located downstream of said variable pitch blade rotor, said first continuously variable stator vane is a variable exit guide vane located downstream of said variable pitch blade rotor and upstream of said first fixed exit guide vane.

20. A gas turbine engine in accordance with claim 19 further comprising a plurality of variable pitch blade rotor stages located between said second variable stator vane and said variable exit guide vane.

21. A gas turbine engine in accordance with claim 20 further comprising a third variable stator vane and a second fixed exit guide vane located between each of said plurality of variable pitch blade rotor stages.

22. A gas turbine engine in accordance with claim 17 further comprising a second compressor positioned in series flow with said high pressure compressor, said second compressor configured as a low pressure compressor.

23. A gas turbine engine in accordance with claim 22 further comprising:
   a combustor located substantially adjacent an output of said high pressure compressor;
   a high pressure turbine located substantially adjacent an output of said combustor, said high pressure turbine coupled to said high pressure compressor by a high pressure rotor shaft; and
   a low pressure turbine located substantially adjacent an output of said high pressure turbine.

24. A gas turbine engine in accordance with claim 23 wherein said low pressure turbine is coupled to said low pressure compressor by a low pressure rotor shaft.

25. A gas turbine engine in accordance with claim 23 wherein said low pressure turbine rotates freely of said high pressure turbine and said high pressure compressor.

26. A gas turbine engine in accordance with claim 21 wherein said variable pitch blade rotor stages and said third variable stator vanes are configured as a second compressor, said second compressor increases the high pressure compressor outlet pressure as a multiple of the ambient inlet pressure, and increases the airflow.

27. A gas turbine engine in accordance with claim 21 wherein said variable pitch blade rotor stages and said third variable stator vanes are configured as an expander, said expander lowers the high pressure compressor outlet pressure as a multiple of the ambient inlet pressure, and lowers the airflow.

28. A gas turbine engine in accordance with claim 20 wherein said plurality of variable pitch blade rotor stages comprises at least two counter-rotating variable pitch blade rotor rows.

* * * * *